United States Patent [19]

Smutny

[11] Patent Number: 4,983,649

[45] Date of Patent: Jan. 8, 1991

[54] STABILIZED POLYKETONE BLEND

[75] Inventor: Edgar J. Smutny, Houston, Tex.

[73] Assignee: Shell Oil Company, Houston, Tex.

[21] Appl. No.: 351,368

[22] Filed: May 15, 1989

[51] Int. Cl.$^5$ ................................................ C08L 1/02
[52] U.S. Cl. ........................................ 524/13; 524/27; 524/35
[58] Field of Search ............................ 524/13, 27, 35

[56] References Cited

U.S. PATENT DOCUMENTS 3,694,412 9/1972 Nozaki ................................. 528/392
4,717,743 1/1988 Wakabayashi et al. ................ 524/35

FOREIGN PATENT DOCUMENTS 121965 10/1984 European Pat. Off. .
181014 5/1986 European Pat. Off. .
222454 5/1987 European Pat. Off. .
257663 3/1988 European Pat. Off. .

*Primary Examiner*—Nathan M. Nutter

[57] ABSTRACT

Polymer compositions comprising an intimate mixture of a linear alternating polymer of carbon monoxide and at least one ethylenically unsaturated hydrocarbon and finely divided cellulose demonstrate improved melt stability and retained apparent crystallinity.

14 Claims, No Drawings

STABILIZED POLYKETONE BLEND

This invention relates to stabilized compositions comprising a linear alternating polymer of carbon monoxide and at least one ethylenically unsaturated hydrocarbon. More particularly, the invention relates to such compositions of the linear alternating polymer and particles of cellulose, characterized by improved melt stability and retained apparent crystallinity.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium as catalyst. Nozaki extended the process to produce linear alternating polymers through the use of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now conventionally known as polyketones or polyketone polymers, has become of greater interest in part because of the greater availability of the polymers. The more recent general processes for the production of the polyketone polymers are illustrated by a number of published European Patent Applications including Nos. 121,965, 181,014, 222,454 and 257,663. The process generally involves the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high molecular weight materials having established utility as premium thermoplastics in the production of shaped articles such as containers for food and drink produced by methods conventional for the processing of thermoplastics. Although the polyketone polymers are crystalline and have well defined melting points, they do to some extent undergo loss of such crystallinity upon repeated melting/solidification cycles. It would be of advantage to provide compositions comprising the linear alternating polymers which demonstrate improved retention of crystallinity.

SUMMARY OF THE INVENTION

The invention provides certain stabilized polymeric compositions comprising linear alternating polymers of carbon monoxide and at least one ethylenically unsaturated hydrocarbon and a process for the production thereof. More particularly, the invention provides compositions comprising the linear alternating polymer having cellulose incorporated therein. The resulting compositions demonstrate melt stability and retained crystallinity upon being subjected to melting and crystallization, and offer improved processability.

DESCRIPTION OF THE INVENTION

The polymers which are stabilized according to the invention are linear alternating polymers of carbon monoxide and at least one ethylenically unsaturated hydrocarbon. The ethylenically unsaturated hydrocarbons which are useful as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least three carbon atoms, particularly an α-olefin such as propylene.

When the preferred terpolymers of carbon monoxide, ethylene and a second hydrocarbon are employed in the compositions of the invention, there will be at least about two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the following repeating formula

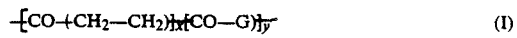

$$\mathrm{+CO+CH_2-CH_2)_x+CO-G)_y+} \quad (I)$$

wherein G is a moiety of the second hydrocarbon polymerized through the ethylenic unsaturation. The $-CO-(CH_2-CH_2)-$ units and the $-CO-(G)-$ units are formed randomly throughout the polymer chain and the ratio of y:x is no more than about 0.5. In the modification of the invention where copolymers are employed in the compositions without the presence of a second hydrocarbon, the polymers are represented by the above formula wherein y is 0. When y is other than 0, i.e., terpolymers are employed, the ratio of y:x is preferably from about 0.01 to about 0.1. The end groups or "caps" of the polymer chain will depend upon what materials are present during the production of the polymer and how or whether the polymer has been purified. The precise nature of the end groups is of little significance so far as the overall properties of the polymer are concerned so that the polymers are fairly represented by the polymer chain as depicted above.

Of particular interest are the polymers of the above formula I having a molecular weight of from about 1000 to about 200,000, particularly those of numerical average molecular weight of from about 20,000 to about 90,000, as determined by gel permeation chromatography. The physical properties of such polymers will depend in part upon the molecular weight, whether the polymer is a copolymer or a terpolymer and, in the case of terpolymers, the nature of and the proportion of the second hydrocarbon present. Typical melting points of the polyketone polymers are from about 175° C. to about 280° C., particularly from about 210° C. to about 270° C. The polymers have a limiting viscosity number (LVN), when measured in m-cresol at 60° C., of from about 0.4 dl/g to about 10 dl/g, particularly of from about 0.8 dl/g to about 4 dl/g.

The polymers are produced by general methods illustrated by the above published European Patent Applications. Although the scope of the polymerization is extensive, a preferred catalyst composition is formed from a palladium salt, particularly a palladium alkanoate such as palladium acetate, the anion of trifluoroacetic acid or p-toluenesulfonic acid and a bidentate ligand of phosphorus such as 1,3-bis(diphenylphosphino)propane or 1,3-bis[di(2-methoxyphenyl)phosphino]propane. The polymerization is conducted under polymerization conditions in an inert reaction diluent. Reaction diluents such as lower alkanols, e.g., methanol or ethanol, or lower alkanones, e.g., acetone or methyl ethyl ketone, or mixtures thereof are satisfactory. Methanol is preferred as the reaction diluent. Typical polymerization conditions include a polymerization temperature of from about 30° C. to about 150° C. and a reaction pressure of from about 10 bar to about 200 bar. The polymer product is typically obtained as a suspension in the reaction diluent and is recovered by conventional methods such as filtration or decantation. The polymer is employed as such in the compositions of the invention or is purified as by contact with a solvent selective for catalyst residues.

The compositions of the invention comprise an intimate mixture of the linear alternating polymer and particles of cellulose. The cellulose component of the compositions of the invention is a highly purified crystalline polymer having a plurality of units of glucose, i.e., $(C_6H_{10}O_5)_n$ with differing end groups. Such polymers have a molecular weight of from about 6,000 to about 1,500,000 but preferably from about 80,000 to about 150,000. They are obtained by methods well known in the art from naturally occurring materials such as cotton and wood fiber. Typical procedures for producing cellulose from such materials includes treatment with organic solvents and dilute alkali, e.g., sodium hydroxide, to remove non-cellulosic impurities followed by a bleach with chlorine or alkali-metal hypochlorite. Other methods employ an additional acid prehydrolysis to remove hemi-celluloses. The resulting cellulose product is a white, crystalline powder of varying particle size. The cellulose that is useful in the compositions of the invention is employed in a finely divided form having a particle size of from about 20 microns to about 100 microns, preferably from about 10 microns to about 30 microns. Such cellulose powders are well known in the art and are commercial.

The compositions of the invention are intimate mixtures of the linear alternating polymer and a stabilizing quantity of the cellulose. Quantities of cellulose from about 0.005% by weight to about 20% by weight, based on total composition, are suitable, with quantities of from about 0.5% by weight to about 10% by weight on the same basis being preferred.

The method of preparing the intimate mixture of polyketone polymer and cellulose is not material so long as an intimate mixture is obtained. In one modification, the polymer and the cellulose in finely divided form are mixed and passed through an extruder to obtain the composition as an extrudate. In an alternate modification the composition is produced in a mixing device such as a mixer or a blender operating at high shear.

The resulting compositions will have an improved melt processability as evidenced by a relatively constant apparent crystallinity, when subjected to multiple cycles of melting and solidification (crystallization), as evidenced by relatively constant melting and crystallization temperatures as well as by relatively constant heats of crystallization. This improvement in retained crystallinity and melt stability offers considerable advantages which are not to be found in unstabilized polymers. For example, a polymer or polymer composition may be converted into nibs by the use of an extruder and the nibs are then suitably injection molded to produce an article, in each case without substantial decrease in the melting point of the polymer composition. Such retention of melting point is of importance when the contemplated use of the article includes exposure to elevated temperature. The compositions of the invention are therefore particularly useful in this and other applications where processing to the desired product requires a series of melting and solidification cycles. While the compositions are also suitably processed by conventional techniques which do not involve melting and solidification of the polymer, the advantages of the compositions of the invention are most apparent when processing operations which do involve the melting and solidification of the polymer are to be employed. The compositions of the invention may also include other materials such as antioxidants, colorants, mold release agents and reinforcements which are added to the polymer together with or separately from the cellulose.

The compositions of the invention are therefore useful for a variety of applications, particularly the production of articles by multiple melting/solidification cycles which are to be employed where elevated temperatures are likely to be encountered. Illustrative of such articles are containers for food and drink and parts and housings for the automotive industry.

The invention is further illustrated by the following Illustrative Embodiments which should not be construed as limiting the invention.

Illustrative Embodiment I

A terpolymer (087/032) of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point 220° C. and an LVN, measured at 60° C. in m-cresol, of 1.96 dl/g.

Illustrative Embodiment II

The terpolymer of Illustrative Embodiment I and mixtures of the terpolymer and cellulose were evaluated in a differential scanning calorimeter (DSC). The cellulose present in the mixtures was a highly purified cellulose fiber having an average particle size of 20 microns. The evaluation was made with a Perkin-Elmer differential scanning calorimeter (DSC) which employs samples of polymer or polymer composition in sealed pan containers. The pan and contents are heated at a controlled rate, typically 20° C./minute, until the temperature at which the sample has melted, $T_m1$. The pan and contents are then cooled until the sample has solidified, $T_c1$, and then heated past a second melting point, $T_m2$, to 285° C. at which temperature the sample is maintained for 10 minutes. The pan and contents are then cooled until the sample has solidified a second time, $T_c2$. The melting and crystallization temperatures are defined as the temperature at which the heat flow reaches a maximum (for melting) or a minimum (for crystallization). Typically the melting point, $T_m$, will be higher than the crystallization temperature, $T_c$. Although a number of factors influence the melting point and the crystallization temperature, these values are also influenced by the crystallinity of the polymer. In general, the smaller the difference between the first and second melting points, the greater the degree of retained crystallinity. The same relationship is generally true for the crystallization temperatures.

It is also possible to determine through the use of the DSC the magnitude of the first and second heats of melting ($H_1$ and $H_2$) and the first and second heats of crystallization ($C_1$ and $C_2$) for the polymer and also for the polymer compositions. In general the heats of crystallization for the compositions will be greater than the corresponding value for the unstabilized polymer. The greater this difference is, the greater the degree of crystallinity which has been retained in the polymer composition. In the DSC evaluation, temperatures are measured in °C. and heats are measured in cal/g.

Samples of the terpolymer of Illustrative Embodiment I and three mixtures of the polymer and cellulose were dry blended (in the case of the mixtures) and tumbled overnight in a plastic bottle. The resulting mixture was extruded through a 15 mm Haake twin screw extruder operating in air. The results of the DSC evaluation of these samples is shown in the Table.

TABLE

| Sample | % by Weight Cellulose | Relative Feed Rate | $T_c2$ | $C_2/C_1$ |
|---|---|---|---|---|
| Polymer | — | 1.0 | 156 | 0.78 |
| Composition | 0.1 | 2.0 | 156 | 0.79 |
| Composition | 1.0 | 2.4 | 166 | 0.92 |
| Composition | 5.0 | 2.2 | 167 | 0.93 |

The improved processability of the compositions is evidenced by the greater feed rate possible with the compositions as compared to the polymer without cellulose.

What is claimed is:

1. A composition stabilized against loss of apparent crystallinity when subjected to melting and crystallization cycles which comprises a linear alternating polymer of carbon monoxide and at least one ethylenically unsaturated hydrocarbon having incorporated therein a stabilizing quantity of a finely divided cellulose.

2. The composition of claim 1 wherein the polymer is of the repeating formula

wherein G is a moiety of an ethylenically unsaturated hydrocarbon of at least 3 carbon atoms, polymerized through the ethylenic unsaturation, and the ratio of y:x is no more than about 0.5.

3. The composition of claim 2 wherein the cellulose has a particle size from about 10 microns to about 30 microns.

4. The composition of claim 3 wherein the cellulose is present in a quantity of from about 0.005% by weight to about 20% by weight, based on total composition.

5. The composition of claim 4 wherein y is 0.

6. The composition of claim 4 wherein the ratio of y:x is from 0.01 to about 0.1.

7. The composition of claim 6 wherein G is a moiety of propylene.

8. A method of stabilizing a linear alternating polymer of carbon monoxide and at least one ethylenically unsaturated hydrocarbon against loss of apparent crystallinity upon being subjected to melting and crystallization by incorporating therein a stabilizing quantity of a finely divided cellulose.

9. The method of claim 8 wherein the polymer is of the repeating formula

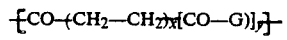

wherein G is a moiety of an ethylenically unsaturated hydrocarbon of at least 3 carbon atoms polymerized through the ethylenic unsaturation, and the ratio of y:x is no more than about 0.5.

10. The method of claim 9 wherein the cellulose has a particle size of from about 10 microns to about 30 microns.

11. The method of claim 10 wherein the quantity of cellulose is from about 0.005% by weight to about 20% by weight, based on total composition.

12. The method of claim 11 wherein y is 0.

13. The method of claim 11 wherein the ratio of y:x is from about 0.01 to about 0.1.

14. The method of claim 13 wherein G is a moiety of propylene.

* * * * *